(12) United States Patent
Barnes (10) Patent No.: US 6,431,792 B1
(45) Date of Patent: Aug. 13, 2002

(54) ARTIFICIAL REEF STRUCTURE

(76) Inventor: S. Lee Barnes, 3952 Shady Oaks Dr., Virginia Beach, VA (US) 23451

( * ) Notice: Subject to any disclaimer, the term of this patent is extended or adjusted under 35 U.S.C. 154(b) by 0 days.

(21) Appl. No.: 09/654,633

(22) Filed: Sep. 5, 2000

(51) Int. Cl.[7] .............................. E02B 3/04; E02B 5/04; E04C 2/04
(52) U.S. Cl. ............................ 405/25; 52/603; 52/604; 52/606; 52/607
(58) Field of Search ............................ 405/15, 25, 284; D25/113, 114, 118; 52/596, 598, 603, 604, 606, 607, 612

(56) References Cited

U.S. PATENT DOCUMENTS

| | | | | |
|---|---|---|---|---|
| 198,651 A | * | 12/1877 | McMullen | 404/34 |
| D23,063 S | * | 2/1894 | Merley | D25/118 |
| 599,864 A | * | 3/1898 | Rapp | 52/585.1 |
| 2,201,110 A | * | 5/1940 | Makram | 52/586 |
| 3,440,788 A | * | 4/1969 | Merget | 52/405.2 |
| 4,436,447 A | * | 3/1984 | Crowe | 405/16 |
| 4,719,738 A | * | 1/1988 | Lee | 52/607 |
| 4,731,279 A | * | 3/1988 | Isshiki | 428/159 |
| 5,230,195 A | * | 7/1993 | Sease | 52/593 |
| D351,422 S | * | 10/1994 | Morris | D20/10 |
| 5,402,609 A | * | 4/1995 | Kelley, Jr. | 52/98 |
| D363,558 S | * | 10/1995 | McCoy | D25/113 |
| 5,471,808 A | * | 12/1995 | de Pieri et al. | 52/603 |
| 5,647,185 A | * | 7/1997 | Forlini | 52/604 |
| 5,899,040 A | * | 5/1999 | Cerrato | 52/604 |
| 5,934,037 A | * | 8/1999 | Bundra | 52/603 |
| 5,987,840 A | * | 11/1999 | Leppert | 52/592.6 |
| 5,992,119 A | * | 11/1999 | Rokhlin | 52/596 |
| 6,152,655 A | * | 11/2000 | Hull | 405/286 |
| 6,178,715 B1 | * | 1/2001 | Pacitto et al. | 52/604 |
| 6,219,981 B1 | * | 4/2001 | Bergelt | 52/294 |

* cited by examiner

Primary Examiner—Gary S. Hartmann
(74) Attorney, Agent, or Firm—David J. Bolduc (57) ABSTRACT

An artificial reef structure is provided including various building components that are preformed from concrete and the like. The components include square blocks having recesses on the upper surfaces and male protrusions on the lower surfaces. The blocks can be matably interlocked by inserting the male protrusions into the female recesses of vertically adjacent blocks. Horizontally adjacent blocks are connected to each other using an adjustable double ring connector fitting within female recesses of adjacent blocks. The blocks allow seawater to flow through them using flow tubes that pass through the block and an interior chamber within the block. The artificial reef structure may be constructed to be positioned as a barrier adjacent to or in place of natural offshore reefs. The reef structure is preferably configured as a castle.

17 Claims, 9 Drawing Sheets

ARTIFICIAL REEF STRUCTURE

BACKGROUND OF INVENTION

1. Field of Invention

This invention relates to artificial reef structures and building systems. More particularly, the invention encompasses underwater structures with stackable and interlocking building block components that can be used as artificial reefs resistant to underwater currents and tidal forces. The artificial reef structure is constructed with components attractive to marine life thereby forming an underwater structure suitable for habitation by marine life as well as being suitable for marine recreational activity.

2. Prior Art

Natural shore reef belts around the world are on the decline from over exploitation. Increased population and concomitant increased use of the coastal environments has resulted in general degradation of the coastal marine environment and increased stress on the habitats of coastal aquatic life. Native reefs are being damaged not only by overuse but are also suffering from human contact, storm damage, dredging damage, and pollution.

For example, human contact often results in damage to the natural reef when snorkelers and divers stand on a shallow reef to rest. While standing, the snorkelers and divers grab on to the reefs themselves to steady themselves and causes unintentional damage to the reefs. In addition, the increased recreational and commercial fishing activity has impacted the reefs. Further problems have occurred as a result of the commercial shipping traffic off the mainland coasts, such as commercial freighter groundings that have damaged many areas of natural reef.

Coastal populations in attempting to restrict the natural changes in the coastline have dredged and erected barriers. This dredging, that is removal of sand around these reefs, creates a back wash of sand drifting back towards the dredging site, scouring and covering the reef it passes over. These populations have also constructed barriers, such as breakwaters and seawalls, to limit the eroding action of waves on shoreline property. These barriers have been built of concrete walls or rock at offshore positions to prevent erosion of the shore. Alternative constructions have included mechanized reefs having stepped deflector panels, frame and screen structure, breakwaters faced with concrete block, hollow blocks for positioning on the bottom, grooved bars for stacking on their sides, vertical pillars with rotatable vanes or crossbars, triangular bodies (tetrapods) that are randomly disposed along the seashore or interconnected stacked frames.

Another means of reducing damage to natural reefs has been to erect structures between the reef and the shoreline so as to reduce the wave force effect upon natural reefs. These artificial reefs have generally consisted of large steel, stone or concrete barriers which serve to intercept the wave forces and protect natural reefs.

A problem with seawalls and breakwaters is that they cause an increase in the vertical force of wave action resulting from the abrupt limitation of the horizontal wave movement. This redirection of wave forces destroys natural reefs and other aquatic habitats from the deposit of sand and other materials carried back out to sea by receding water currents.

Another problem with presently available artificial reefs that redirect wave forces to lessen impact on natural reefs, is that they generally lack appropriate design features which are attractive to sea life for habitation and reproduction.

Another problem with artificial reefs that are not attractive to coastal aquatic life is that their utility is limited to that of simple maintenance of existing natural reefs and that they do not contribute to an increase in habitat area or improvement of the coastal marine environment.

Another problem with presently available mechanical reefs in coastal areas where natural reefs have been virtually destroyed is that they fail to provide materials and shapes desired by marine life for inhabitation.

Another problem with these mechanical reef constructions is that the need still exists for an effective offshore reef assembly which can be made and assembled at a reasonable cost.

Another problem with randomly dispersed blocks like tetrapods is that they can not be connected or coupled together with one another to increase the strength and the rigidity of the breaker or sea wall.

Thus, the need exists for an artificial reef that avoids the problems of the prior art.

SUMMARY OF THE INVENTION

This invention relates to a structure for enhancing aquatic habitats for marine life, and more specifically to an artificial reef which may be used to protect existing natural reefs or to substitute for damaged or destroyed natural reefs. More specifically, invention relates to novel, stackable and interlocking building block components used as artificial reefs that are resistant to underwater currents and tidal forces. The artificial reef structure is constructed with components attractive to marine life thereby forming an underwater structure suitable for habitation by marine life as well as being well suited for marine recreational activity.

Therefore, a primary objective of the present invention is to provide a construction assembly in which the blocks 1 thereof can be stably connected and coupled together so that the construction assembly has high strength and high rigidity.

Another important object of the present invention is to provide a mechanical reef structure that provides a habitat suitable to aquatic life.

It is also an objective of the present invention to provide an aquatic reef that is constructed of components that encourage habitation by marine life.

Another objective is to provide an artificial reef structure that provides a large amount of surface area suitable for colonization by marine life.

It is also an objective of the present invention to provide an aquatic reef which is constructed of components that will neither harm the marine environment nor rapidly be destroyed by the corrosive effect of salt water.

Yet another objective of the present invention is to provide an artificial reef which can provide protection for already existing natural reefs while increasing the suitable aquatic habitat in the vicinity of the natural reef.

A further objective of the present invention is to provide an artificial reef that may easily and conveniently be transported to and assembled in the selected site.

Another object of this invention is to provide an artificial reef having a versatile construction design.

Another objective is to provide design flexibility of the reef through use of modular design components.

Another object of this invention is to provide an artificial reef that allows for expansion of an artificial reef system as appropriate.

Another object of this invention is to provide artificial reefs with versatile architectural design in order to enhance tourist and diver attractions.

Another objective of the present invention to provide a cost effective artificial reef system.

Further objects and advantages of this invention will be apparent from the following detailed description of a presently preferred embodiment that is illustrated in the accompanying drawings.

DETAILED DESCRIPTION

The present invention comprises an integrated reef building system. This system allows for the underwater construction of a series of artificial reefs. The reef is constructed of independent interlocking blocks 1 that may be arranged in a pattern to provide both a marine habitat and an attractive diving locale. In accordance with one aspect of the invention, there is provided a structure including a number of blocks 1 with female and male connectors, which can be coupled together so as to form a wall or more preferably several walls in the configuration of an undersea castle, as is illustrated in FIGS. 12 through 15.

Figure 1:
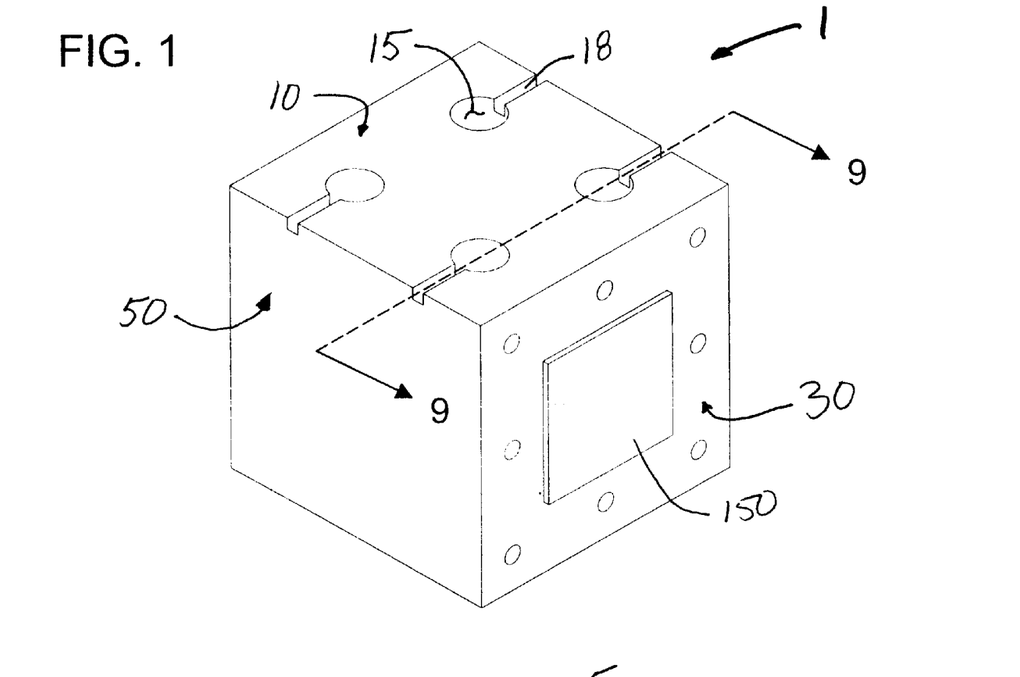
FIG. 1 is a perspective view of the top and front of one embodiment of a building block of the present invention.
Figure 2:
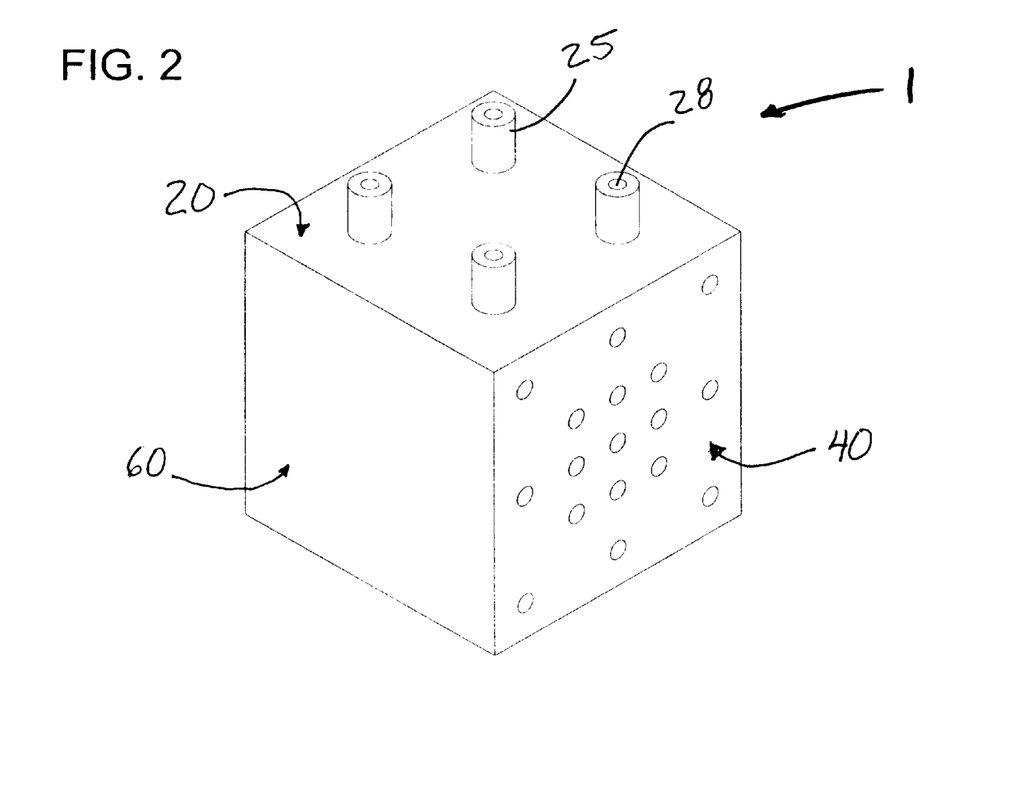
FIG. 2 is a perspective view of the bottom and back of one embodiment of a building block of the present invention.

Referring to FIGS. 1 and 2: Each block 1 utilized in the structure comprises an essentially rectahedral parallelepiped with six faces: an upper and lower face 10 and 20, a front and back face 30 and 40, and side faces 50 and 60 respectively. The blocks 1 are constructed of concrete, preferably with a near neutral pH. All blocks 1 preferably also contain steel wire for reinforcement of concrete. The near neutral pH of the concrete desensitizes the blocks 1 to breakdown in the marine environment. This also allows for the attachment and growth of a greater variety of marine life to the blocks 1.

The opposite faces of the blocks 1 (top and bottom 10 and 20, and sides 50 and 60) are sized and shaped to matingly interengage with vertically and horizontally adjacent blocks 1 respectively. More specifically, each block 1 has at least one female recess 15 formed in the top surface 10 of the block 1 and at least one male protrusion 25 formed on the bottom surface 20 of the block 1. More preferably each block 1 has at least four recesses 15 and four protrusions 25 located in proximity to each of the four corners of the respective top and bottom surfaces 10 and 20 of the blocks 1. The male protrusion(s) 25 of the blocks 1 are adapted to be received in the female recess(es) 15 of adjoining blocks 1 so that the blocks 1 can be stably coupled together in both vertical and horizontal interlocking configurations. To facilitate this mating, the female recesses 15 and male protrusions 25 are positioned on the top and bottom surfaces 10 and 20 such that they are concentric. In other words, the geometric centers of the cross-sections of the female recesses 15 and male protrusions 25 are aligned with an axis that is normal to the top and bottom surfaces 10 and 20 and passing through their geometric centers. This provides for a structure wherein any number of blocks 1 can be coupled together. Such a structure allows for a plurality of the blocks 1 to be interfitted into a three-dimensional array such as that illustrated in FIGS. 12–15.

Referring again to FIG. 2: Each male protrusion 25 extends normal to the bottom surface 20. Each male protrusion 25 is preferably of a hollow cylindrical configuration. The hollow cylinder has a cylinder height and a cross-section having an internal and an external diameter. The hole 28 defined by the internal diameter of the hollow cylinder preferably extends completely through the male protrusion 25 and through the top surface 10 of the block 1 and through to the bottom surface 20 of the block 1. Most preferably the hole 28 extends through the center of the male protrusion 25 through the block 1 and into the female recess 15 in the top surface 10 of the block. Optionally, the male protrusion 25 may be of another hollow configuration such as a square, oval or triangle, or it may not be hollow at all.

Referring now to FIG. 1: Each female recess 15 extends into the block 1 normal to the top surface 10. Each female recess 15 is preferably of a hollow cylindrical configuration defined by the depth of the cylindrical recess 15 and a cross-section having a diameter. The depth of the female recess 15 is at least as high as the height of the male protrusion 25 inserted therein, and optionally larger in depth than the height of the male protrusion 25. The diameter of the female recess 15 is also at least equal to the outer diameter of the male protrusion 25 and preferably larger in diameter than the outer diameter of the male protrusion 25. Optionally, the female recess 15 may be of another cross-section such as a square, triangular or other geometric prism-shaped recess 15 adapted to receive a male protrusion 25.

Figure 9:
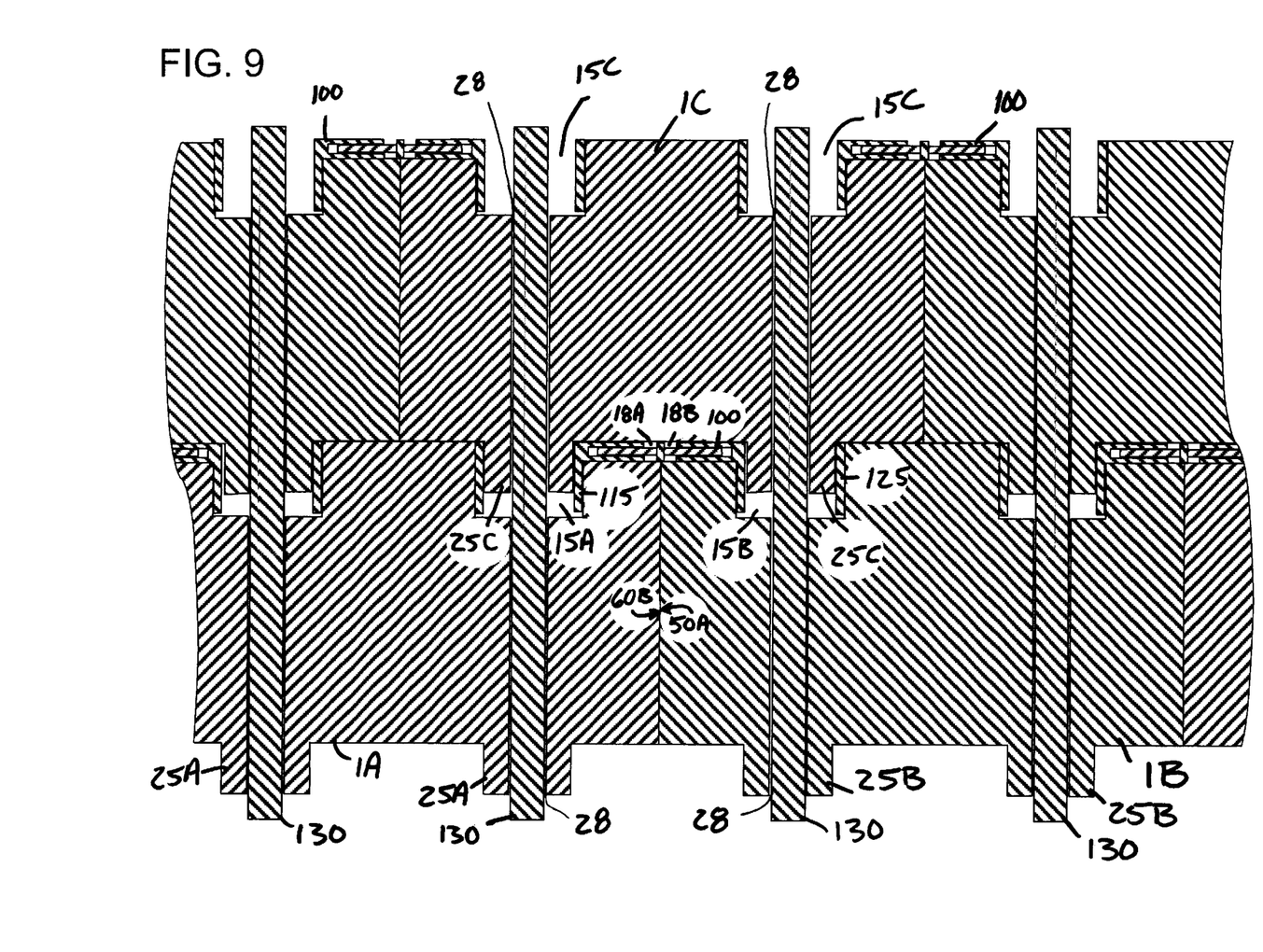
FIG. 9 is a cross-sectional elevation view of stacked building blocks showing the double ring connecting bars connecting horizontally adjacent building blocks and tie rods passing through vertically adjacent building blocks, the cross-section of each block being taken along line 9—9 of FIG. 1.

Preferably, the male protrusion 25 and female recess 15 are molded into the block 1 when it is initially formed. Specifically, when the concrete of the block 1 is poured into a form (not shown), the form has male protrusions 25 and female recesses 15 on the opposing outer surfaces of the form. The male protrusion 25 preferably has a hollow cylindrical configuration defined by a height of the cylinder and a cross-section having an internal and an external diameter. The hollow interior 28 of the male protrusions 25 that extend into the female recesses 15 are formed by inserting rods into the centers of each male protrusion 25 part of the concrete form and through to the female recess 15 portion of the form. After the form is poured and dried, the rods are removed to leave a hollow portion 28 extending through each male protrusion 25 through to the female recess 15 on the opposite surface 10 of the block 1. This facilitates the passing of a metal rod 130 through the block 1 as shown in FIG. 9. Passing a rod 130 through vertically adjacent stacked blocks 1 adds strength and stability to a structure constructed from these blocks 1. Optionally, hollow male protrusions 25 and female recesses 15 may be molded into the block 1 by pouring concrete into a mold around preformed units (not shown), having protrusions 25 and recesses 15 which are mutually stackable. The stackable units may also have molded extension arms that extend into the concrete to more firmly hold the stackable units in place in the blocks 1. Thus, multiple blocks 1 may then be stacked and metal rods 130 may be passed through the central holes 28 of vertically adjacent stacked blocks 1 in order to add strength to a structure constructed from these blocks 1.

Referring again to FIGS. 1 and 9: The blocks 1 also have lateral channels 18 in the top surfaces 10 of each block 1. Namely, a channel 18 extends from each female recess 15 toward the adjacent side 50 or 60 of the block 1, i.e., neither the front 30 nor the back 40 of the block 1. The channels 18 of horizontally adjacent blocks 1 meet with each other to form a single channel extending from the female recess 15 of one block 1 to the female recess 15 of an adjacent block 1.

Figure 7:
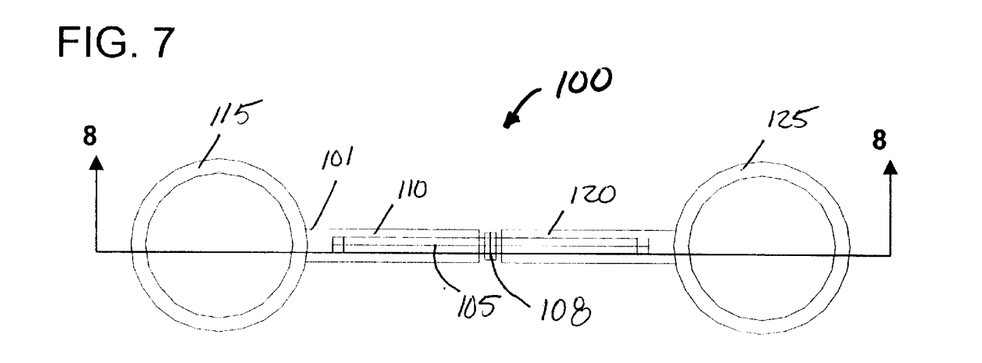
FIG. 7 is a plan view of a double ring connecting bar which is placed in the channels in the tops of adjacent building blocks.
Figure 8:
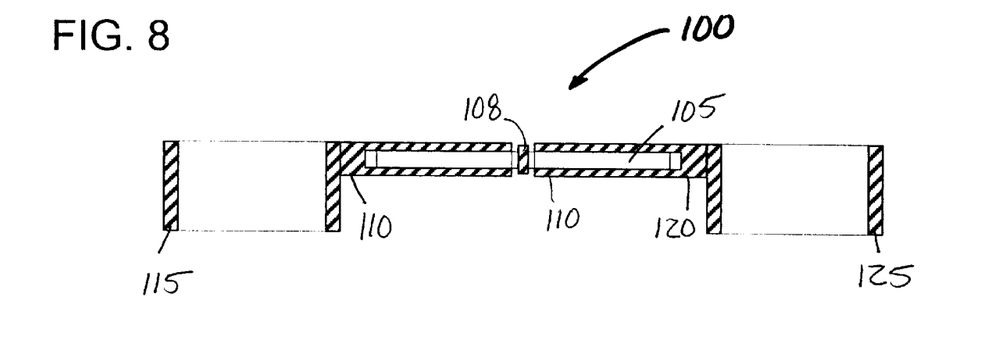
FIG. 8 is a cross-sectional elevation view of a double ring connecting bar along line 8—8 of FIG. 7.

Referring now to FIGS. 7 and 8: The channels 18 allow the placement of connecting rods 100 into two adjoining channels 18 of adjacent blocks 1 on the same horizontal plane. More preferably, the connecting rod 100 comprises a double ring connector extending across two adjacent channels 18 and connecting adjacent female recesses 15. The connecting rod 100 essentially comprises a central connecting member 101, which may simply comprise a steel rod, with a ring 115 and 125 on each end of the connecting member 101. The rings 115 and 125 may be rigidly attached to each end of the connecting member 101, or the rings 115 and 125 may be allowed to pivot about a connection point to the connecting member 101.

Most preferably, the connecting member 101 of each connecting rod 100 comprises an adjustable turnbuckle. Each turnbuckle comprises two hollow threaded members 110 and 120 screwably mated to each other with a central screw member 105, as is conventional in turnbuckles. The screw member 105 has an adjustment nut 108 in its center, to allow the hollow members 110 and 120 to be drawn closer to each other or extended further from each other.

Each ring 115 and 125 is adapted to fit snugly within a female recess 15. The ring 115 or 125 is also adapted to allow insertion of a male protrusion 25 therethrough. To facilitate the mating of each ring 115 or 125 between the female recess 15 and the male protrusion 25, the ring 115 or 125 has an outer diameter slightly less than the diameter of the female recess 15 and an inner diameter slightly greater than the outer diameter of the male protrusion 25 and a depth not greater than the depth of the female recess 15.

The rings 115 or 125 of the connecting rod 100 are inserted into the recesses 15 of horizontally adjacent blocks 1. The adjustment nut 108 on the screw member 105 of the turnbuckle may then be rotated to draw the hollow threaded members 110 and 120 inward. As the hollow members 110 and 120 are drawn closer, the attached rings 115 or 125 that are fitted into the female recesses 15 pull the horizontally adjacent blocks 1 closer together. As the recesses 15 are drawn closer, the sides 50 and 60 of the blocks 1 come closer to each other up to the point that they are in contact. Thus, the connecting rods 100, through use of the double ring turnbuckle construction, allow horizontally adjacent blocks 1 to be firmly held against adjacent blocks 1. Alternatively the screw member 108 of the adjustment rod 100 may be loosened so that there is more play between horizontally adjacent blocks 1. Alternatively, the connecting rod 100 may comprise tabs at the end of connecting member 101, which fit into slots (not shown) in the bottom surfaces of the channels 18 or into the female recesses 15.

Figure 3:
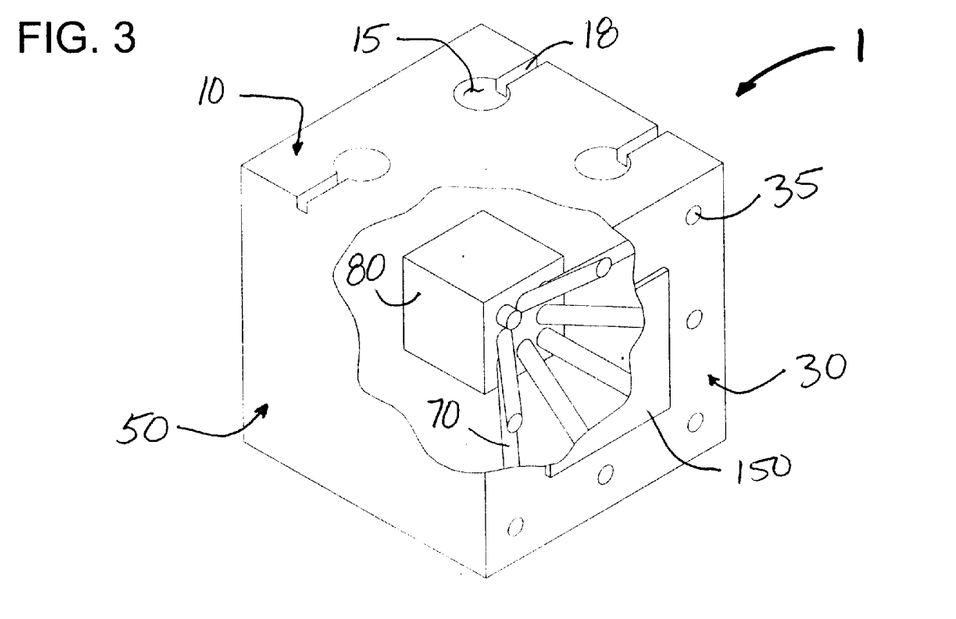
FIG. 3 is a perspective breakaway view of the building block of FIG. 1 showing the front flow tubes leading to the expansion chamber.
Figure 4:
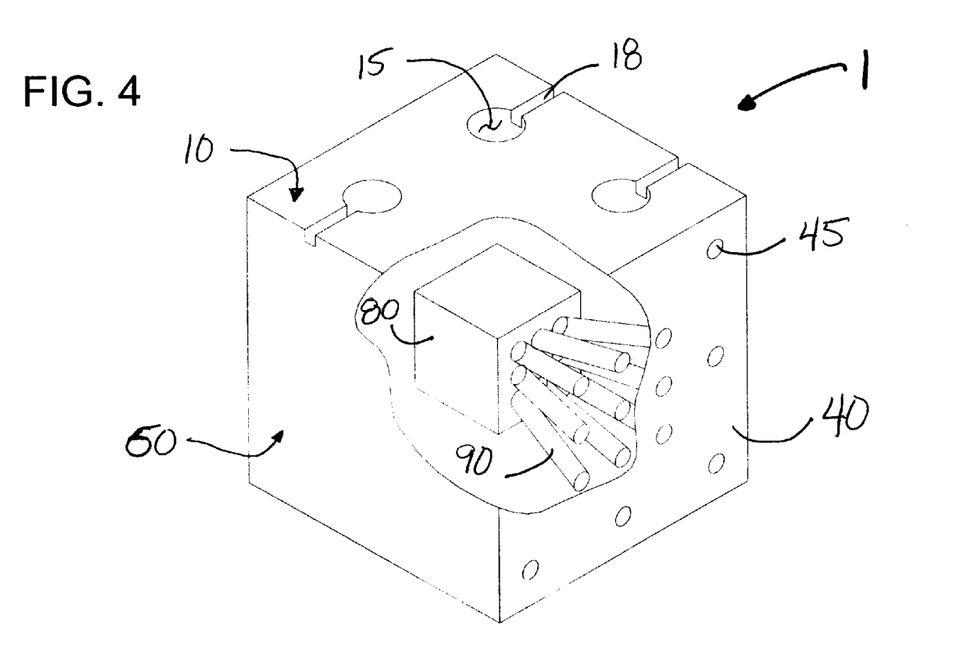
FIG. 4 is a perspective breakaway view of the building block of FIG. 1 showing the rear flow tubes leading away from the expansion chamber.

Referring now to FIGS. 3 and 4: Each block 1 is preferably hollow, having an expansion chamber 80 or turbulence chamber located in the center of the block 1. Preferably, the expansion chamber 80 is shaped like the parallelepiped block 1 within which it is located. Specifically, cubic blocks 1 such as in FIG. 1 have cubic expansion chambers 80 therein, and more specifically a 2×2×2 foot block 1 may have a 1×1×1 foot expansion chamber 80 located centrally therein. However, other shapes of expansion chambers 80 are possible and desirable such as, for example spherical, tetrahedral or other shapes. The expansion chambers 80 are molded into the block 1 and may comprise a hollow shell composed of metal or plastic or wood, but most preferably steel. The steel construction of the turbulence/expansion chamber 80 adds strength to the surrounding concrete block 1. The expansion chambers 80 may also be covered on the outside with extension arms (not shown), which are small protrusions of steel rod allowing a firm bond between the turbulence chamber 80 the surrounding concrete and also adding strength to the surrounding concrete. The steel also attracts specific bacteria acting as a catalyst for marine growth.

Referring now to FIGS. 3 through 6: The expansion chamber 80 works in conjunction with flow tubes 70 and 90 connected to openings 35 and 45 formed in the front and back faces 30 and 40 of each block 1, allowing the expansion chamber 80 to be in fluid communication with front and back faces 30 and 40 of the block 1 through the flow tubes 70 and 80 and openings 35 and 45. The flow tubes 70 and 90 are arranged such that some of them extend directly through the block 1 and/or such that they either radially converge towards the hollow central expansion chamber 80 from the front face 30 or emanate from the hollow central expansion chamber 80 to the back face 40. The flow tubes 70 and 90 run into the expansion chamber 80 which changes the direction of flow through the flow tubes 70 and 90, causing the seawater flowing into and through the expansion chamber 80 to expand and have a turbulent flow. The flow tubes 70 and 90 are each preferably made of wood or bamboo molded into the concrete block 1. The wood or bamboo material provides food for specific marine life, acting as a catalyst for growth of marine life on and in the blocks 1. Rather than bamboo or wood, some or all of the flow tubes 70 and 90 may be made of other piping material such as metal or plastic.

Figure 5:
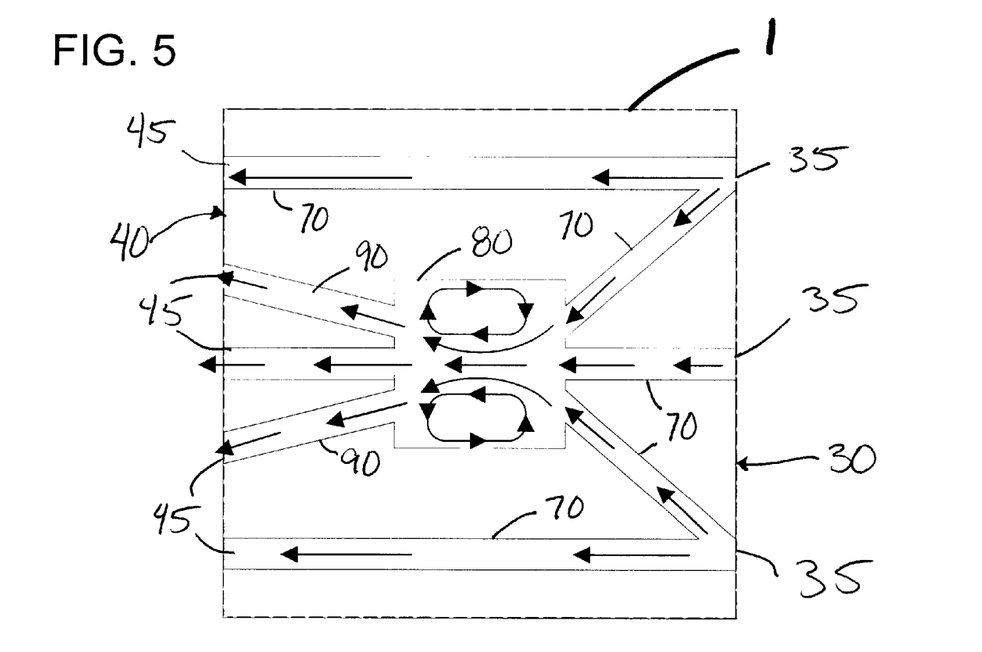
FIG. 5 is an elevation view showing forward flow through the flow tubes and expansion chamber, showing the surrounding building block in ghost.

Referring now to FIGS. 3 and 5: Openings 35 are located in the front face 30 of the block 1, which communicate with flow 70 tubes extending through the block 1. The flow tube openings 35 on the front face 30 are preferably located at least at each corner of the front face 30. More preferably, the flow tube openings 35 on the front face 30 are located at each corner of the front face 30 and at least one location between each corner opening 35 on the front face 30. Each of the openings 35 in the front face 30 of the block 1 connects to a flow tube 70 that extends directly through the block 1, i.e., from the front face 30 to an opening 45 on the back face 40. Each of these openings 35 in the front face 30 of the block 1 also connects to a flow tube 70 that converges radially towards and into the expansion chamber 80.

Figure 6:
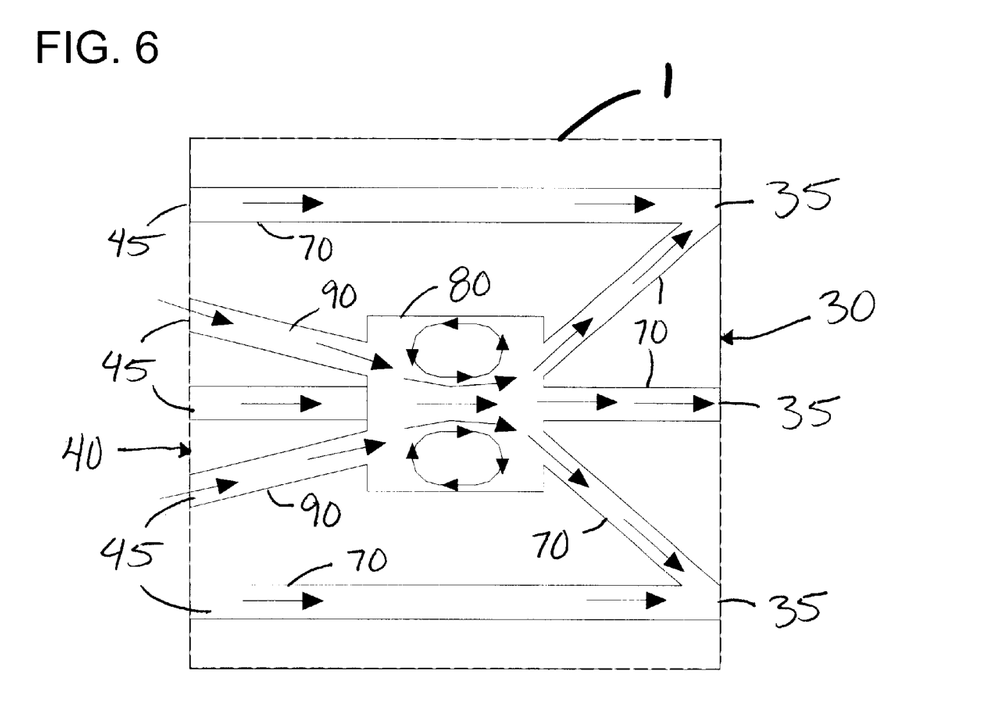
FIG. 6 is an elevation showing backward flow through the flow tubes and expansion chamber, showing the surrounding building block in ghost.

Referring now to FIGS. 4 and 6: Flow tubes 90 also emanate from the expansion chamber 80 towards the back face 40 of the block 1. More specifically, in addition to the openings 45 on the back face 40 of the block 1 corresponding to the flow tubes 70 connecting the front face 30 directly to the back face 40, there are several more openings 45 on the back face 40 of the block 1 corresponding to the flow tubes 90 that emanate radially from the expansion chamber 80. These openings 45 are preferably located in the vicinity of the central area of the back face 40 of the block 1, and more preferably, there is an opening 45 in the center of the back face 40 of the block 1 surrounded by four or more openings 45, and most preferably a total of nine openings 45. An expansion chamber 80 with flow tubes 70 and 90 configured in this manner, thus has flow tubes 90 connecting the expansion chamber 80 to the back face 40 which form an angle with the expansion chamber 80 that is closer to perpendicular than are the flow tubes 70 connecting the expansion chamber 80 to the front face 30 of the block 1.

Referring now to FIGS. 5 and 6: In operation, seawater flows against the front face 30 of the block 1 entering the openings 35 in the front face 30. Some of the water flows directly through the block 1 from the front face 30 through the flow tube 70 and out of the back face 40. The remainder of the water entering the openings 35 in the front face 30 of the block 1 flows through the flow tubes 70 converging on the expansion chamber 80. As the water enters the expansion chamber 80 it strikes the interior surfaces of the expansion chamber 80, expanding and changing directions rapidly to generate a turbulent flow. Due to the expansion, directional changes and turbulent flow, the velocity of the water decreases. The water then exits the expansion chamber 80 through the flow tubes 90 that radially emanate from the expansion chamber 80 and towards the back face 40 of the block 1. The water exits the openings 45 in the back face 40 of the block 1 with a lower velocity than the water impinging on the front face 30 of the block 1. Thus, the expansion chamber 80 and flow tubes 70 and 90 configured in this manner decrease the forward velocity of water flowing therethrough, while reducing the overall pressure on the front face of a wall formed of these blocks 1.

Conversely, as in FIG. 6, due to tidal action seawater also flows against the back face 40 of the block 1 entering the openings 45 in the back face 40. Some of the water flows directly through the block 1 from the back face 40 through the flow tube 70 and exits out of the front face 30. The remainder of the water entering the openings 45 in the back face 40 of the block 1 flow through the flow tubes 90 converging on the expansion chamber 80. As the water enters the expansion chamber 80 it strikes the interior surfaces of the expansion chamber 80, expanding and changing directions rapidly to generate a turbulent flow. Due to the expansion, directional changes and turbulent flow, the velocity of the water decreases. The water then exits the expansion chamber 80 through the flow tubes 70 that radially converge on the expansion chamber 80 and towards the front face 30 of the block 1. The water exits the openings 35 in the front face 35 of the block 1 with a lower velocity than the water impinging on the back face 40 of the block 1. Thus, the expansion chamber 80 and flow tubes 70 and 90 configured in this manner decrease the velocity of water flowing both back and forth through them. The flow tubes 70 and 90 thus allow the water to pass through the block 1 to the other side, reducing pressure against the block 1 and thereby reducing pressure against a wall of a structure or reef built therefrom. This also reduces the wear on individual blocks 1 as well as reduces the overall force against the reef wall.

Referring now to FIGS. 12–15: Depicted is the preferred exterior design of a "Castle Reef" structure 200 utilizing the described building blocks 1 and using an overlapping building design. The castle walls are formed by overlapping individual layers such as is done in bricklaying or masonry, with the exception that the male protrusions 25 and female recesses 15 as well as the connecting members 100 and tie rods 130 add exceptional stability to the structure.

Figure 12:
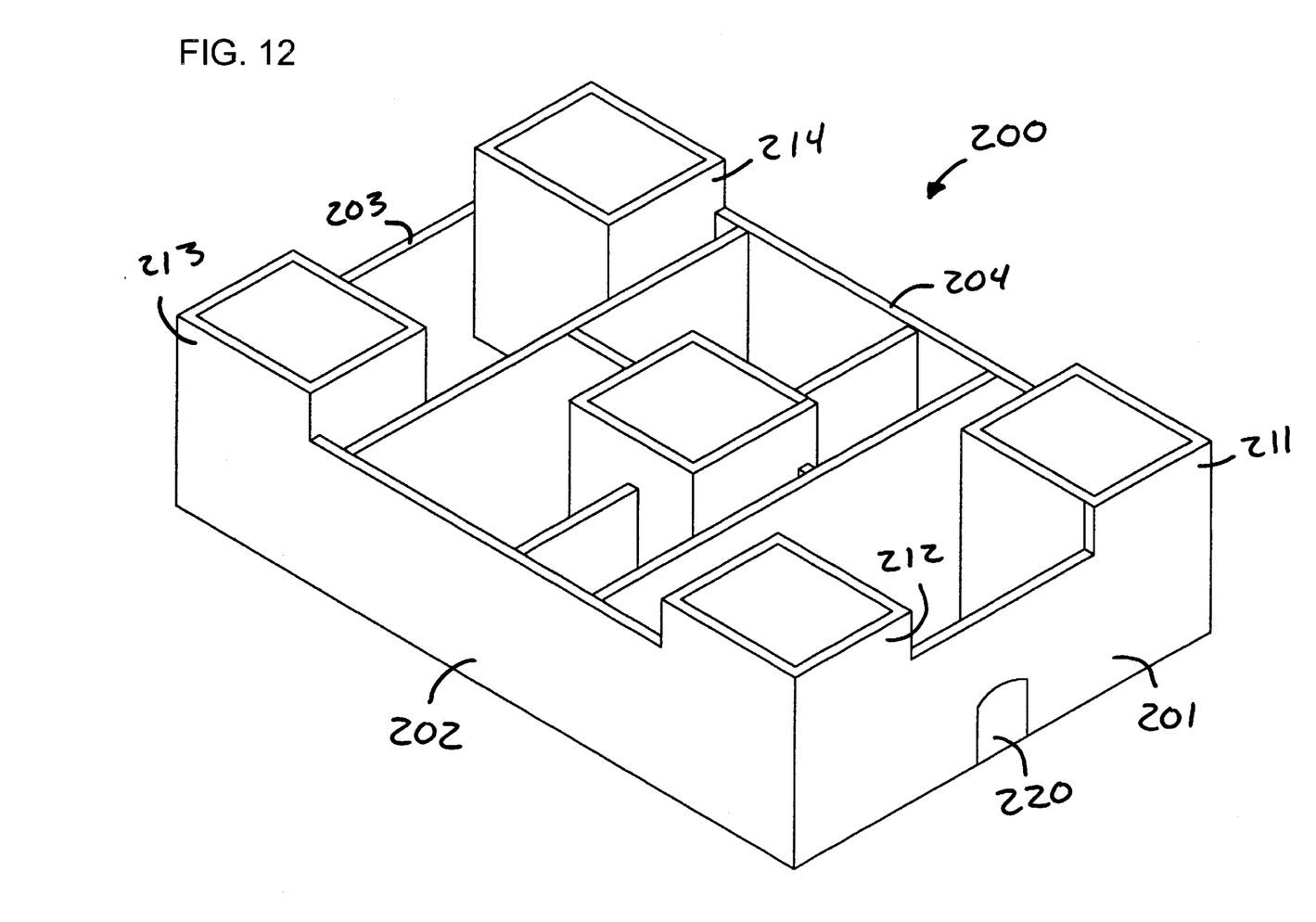
FIG. 12 is a perspective view of a preferred embodiment of the invention's building blocks stacked into a castle-like structure.
Figure 13:
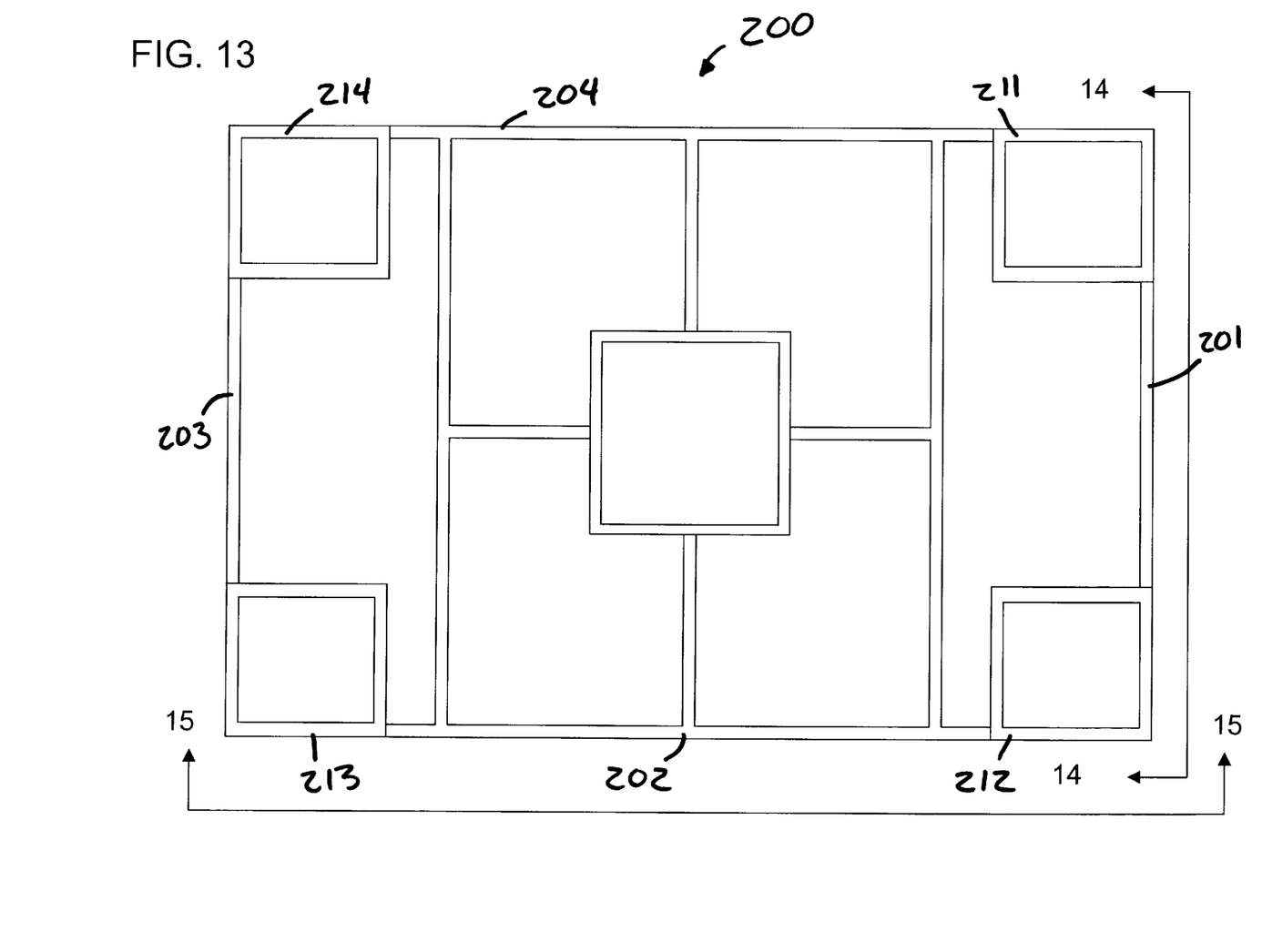
FIG. 13 is a plan view of the structure or FIG. 12.
Figures 14, 15:
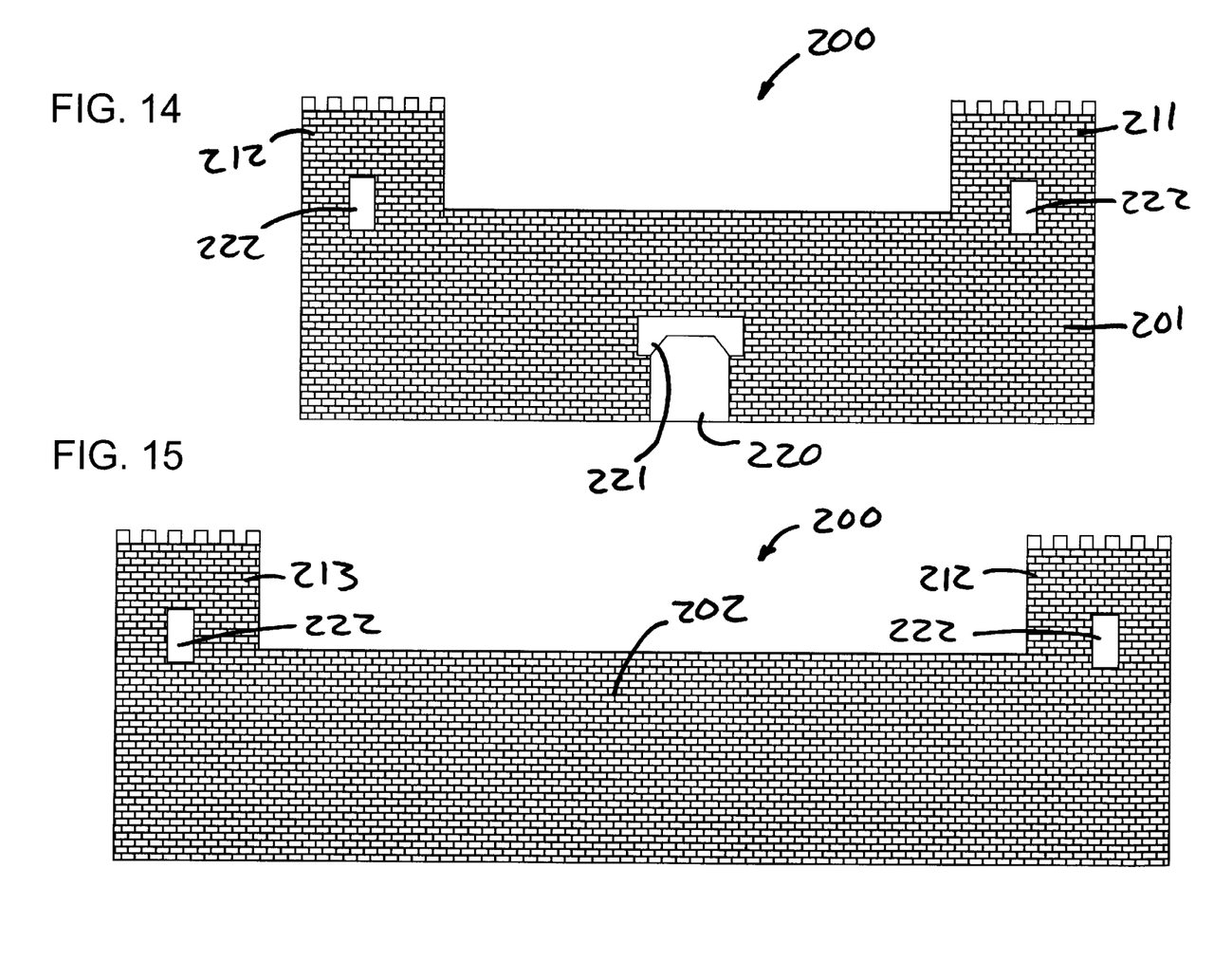
FIG. 14 is an elevation view of along line 14—14 of FIG. 13.
FIG. 15 is an elevation view of along line 15—15 of FIG. 13.

FIG. 12 is a perspective view of a preferred embodiment of the invention stacked into a castle-like structure 200. FIG. 13 is a plan view of the structure 200 of FIG. 12, showing a structure 200 with four exterior walls 201, 202, 203 and 204. As shown in FIGS. 12 and 13, the structure preferably has a tower 211, 212, 213, and 214 in each corner. The castle 200 may have additional walls located interior to the structure 200. FIG. 14 is a view of one wall 201 along line 14—14 of the structure 200 of FIG. 12. In the preferred embodiment of the invention, the structure 200 has at least one door 220 centrally located in a wall 201, but may have one or more doors 220 in one or more walls. To support the wall 201 structure above openings such as doors 220, the wall 201 of the structure 200 may include longer blocks 2 such as that in FIG. 10, or may include a solid arch-piece 221 as depicted in FIG. 14. Also in the preferred embodiment of the structure, each tower 211, 212, 213 and 214 has a window 222 in its center. To support the wall 201 structure above openings such as windows 222, the wall 201 of the structure 200 may include longer blocks 2 such as that in FIG. 10. FIG. 15 is a view of along an adjacent wall 202 of that 201 in FIG. 13.

Referring to FIG. 9: FIG. 9 depicts the preferred construction of a wall using overlapping horizontal layers of blocks 1. More specifically, blocks 1 in a structure wall 201 are preferably stacked in the following manner: Blocks 1A and 1B are placed next to each other in a horizontal layer such that the channels 18 of the adjacent blocks 1A and 1B meet with each other to form a single composite channel 18. A connecting rod 100 is placed in both horizontal channels 18A and 18B and the recesses 15A and 15B. More specifically, the connecting member 101 is placed in the channels 18A and 18B and the rings 115 and 125 on the ends of the connecting member 101 are mated with the female recesses 15A and 15B of adjacent blocks 1A and 1B respectively. The screw member 108 of the turnbuckle is then tightened to bring the sides 60A and 50B of horizontally adjacent blocks 1A and 1B into alignment with each other. Additional blocks 1 may be connected to the first blocks 1A and 1B to form a horizontal layer of the desired length of blocks 1.

An additional horizontal layer is then stacked on top of the first horizontal layer. The second horizontal layer is stacked on the first horizontal layer in an overlapping fashion so that the male protrusions 25 of each block 1 are mated with the female recesses 15 of at least two blocks 1 beneath it. More specifically, each block is stacked like block 1C, which is placed on top of the previous layer of blocks 1A and 1B so that the block 1C has two male protrusions 25C inserted through the connecting rod rings 115 in two female recesses 15A of one block 1A, and through the connecting rod rings 125 in two female recesses 15B of the horizontally adjacent block 1B. Each additional horizontal layer is stacked in this fashion so that the top or bottom of each block 1 is mated with at east two other blocks 1. Upon completion of a suitable number of horizontal layers, a vertical tie rod 130 is inserted into the hole 28 in each female recess 15 through the block 1C and male protrusion 25 and into and through each vertically adjacent block 1A and 1B. Thus, the overlapping method of stacking the blocks 1 provides stability to a wall formed from these blocks 1. The vertical rods 130 passing through the blocks 1 provide additional stability in the vertical plane and the connecting rods 100 in the lateral channels 18 and female recesses 15 provide horizontal stability to a wall constructed from the interlocking blocks 1.

Figure 10:
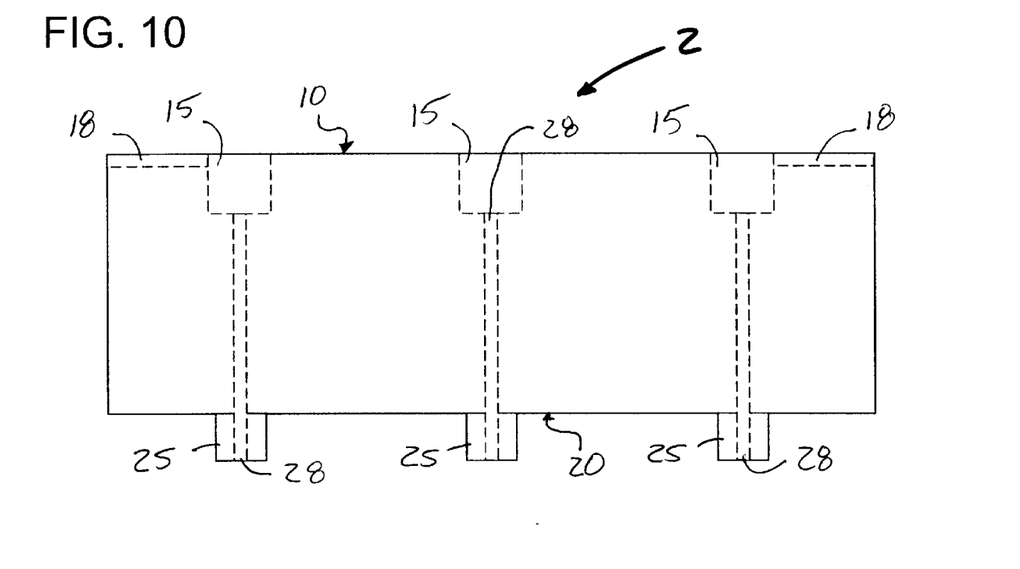
FIG. 10 is an elevation view of another block used in the present invention.

Referring now to FIG. 1 and 10: The blocks 1 may come in several configurations to facilitate the building of a stable structure. For example, the standard building block 1, to be placed in the center of a 2 foot thick wall may comprise a cubic block 1, as in FIG. 1, measuring 2×2×2 feet. For greater stability and around openings in a wall a block 2, such as that in FIG. 10, measuring 3×2×2 feet may be used. In such blocks 2, four male protrusions 25 extend from the bottom surface of the block 2 in proximity to the corners, as well as four recesses 15 in the top surface of each block 2 in proximity to the corners. Preferably, in a 3×2×2 block 2, there are six male protrusions 25 and female recesses 15, with one male protrusion 25 and female recess 15 in proximity to each corner and one more male protrusions 25 and female recesses 15 located between each of the front and back pairs of male protrusions 25 and female recesses 15 respectively. For even greater stability or around openings in a wall, blocks (not shown) measuring 4 or more feet long may be used with such blocks having preferably two male protrusions 25 and female recesses 15 per foot evenly spaced thereon.

Figure 11:
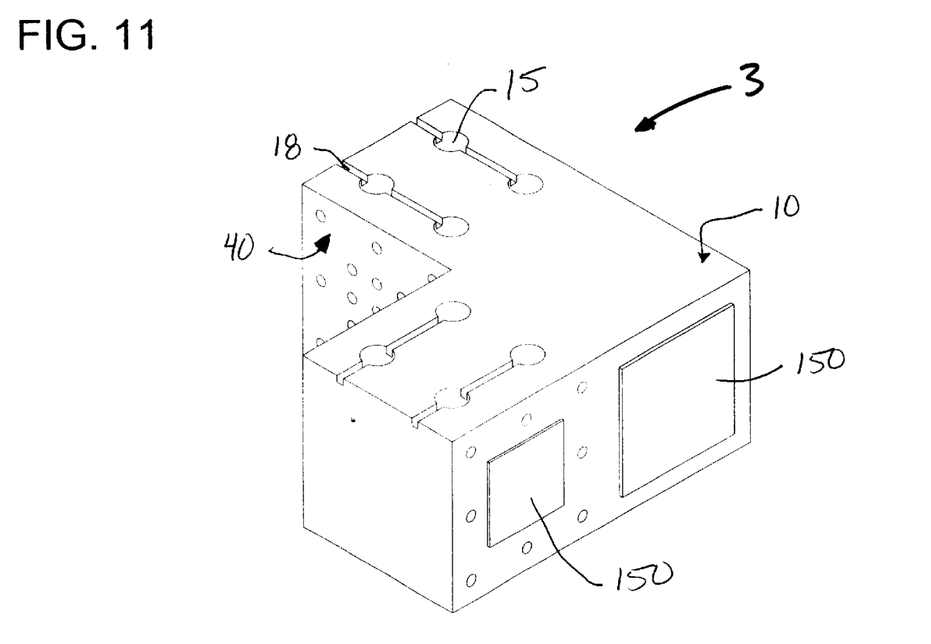
FIG. 11 is a perspective view of a corner block used in the present invention.

Referring to FIG. 11: Lastly, for greater stability at and around corners of adjacent walls, corner blocks 3 may be used. These blocks 3 essentially comprise two of the standard building blocks 1, i.e., 2×2×2, having their respective sides attached to adjacent sides of a third block. The third block may be solid or may have additional male protrusions 25 and female recesses 15 thereon. Useful measurements for corner blocks 3 include blocks 3 measuring 4×4×2×2 feet with evenly spaced male protrusions 25 and female recesses 15 arranged thereon. Corner blocks 3 may also be of larger dimensions with additional male protrusions 25 and female recesses 15 arranged thereon.

Referring again to FIGS. 1 and 10: To the front face 30 of the block 1 is preferably attached a plate 150 or memorial plaque, whereby the block 1 can carry identifying indicia. The plaques 150 are engraved to show a dedication or the owner of the particular block 1 or 3 in a wall or whatever information is desired by a customer who has purchased the block. This facilitates the funding of the building of an artificial reef and or castle by having indicators of the donors for both the benefit of the donor and for those personnel who dive at the location. Plaques 150 are preferably made of durable materials such as marble, bronze or slate, but may also be made of other metals or plastic. The plaques 150 are attached to the block 1 with bolts (not shown) that are embedded into the blocks 1 during molding. The bolts are constructed of suitable material such as brass, which are molded into the block 1 and thereby add strength to the blocks 1.

One unique characteristic is the versatility in potential construction designs. Blocks 1 interlock to provide stability and the completed structure(s) gain stability as a result of the vertical rods 130 and horizontal connecting rods 100. Because of the ease of construction of walls and the interchangeability of the components many other dimensions and designs of underwater structures may be built from the blocks 1, 2 and of the invention. This stackability and interchangeability allows for expansion of the artificial reef system as budgeting and deployment constraints may dictate.

In marine environments where shifting sands tend to cover artificial reefs over time, this particular artificial reef can be expanded by adding more blocks 1 (components). Pre addition areas would remain as the buried foundation for future building. This novel artificial reef invention also slows the sand as it is washed back from a shoreline and a base which a natural growth of native marine life can take root.

Each free standing single block 1 (component) creates viable habitat for fish and a growth substratum for the attachment of marine plant or animal life. Stacking and interlocking more components expands the habitat. Each configuration of block 1(s) is expandable without interfering with the initial application. The surface of the modules, as a result of mold design, features exposed aggregate surface. This aggregate surface creates an ideal substratum for the attachment of marine plants and animals. In any configuration, the blocks 1 can create a suitable base for the attachment of a myriad of different marine life. The adaptability of possible patterns allows for the creation of an artificial patch reef on barren sand.

The natural attachment of coral colonies on artificial reefs is well documented. Therefore, the artificial reef components provide an excellent substratum for the attachment of coral and other species. The invention provides the needed foundation for the selective seeding of an artificial reef. The inherent stability of this design makes it an excellent breakwater useful in areas of coastal erosion. It creates habitat and breakwater, more suitable than loose rocks or boulders. Development of these artificial reef structures can help the environment and improve local tourist and fishing industries.

Many artificial reefs are designed to attract large fish where they may be more easily fished the particular design of this invention is to create a habitat for marine plants and animals. This habitat can develop into a self-sustaining ecosystem which enhances to overall marine environment. The components can be accumulated at the surface and deployed in very deep water. The blocks and structures built therefrom create ideal platforms for culture of coral, lobster, abalone, edible oysters, cultured oysters, mussels, marine plants (kelp) algae, clams to name a few would be enhanced with the specific application of configuring these construction units (modules) in a design most suited to the specific species. Furthermore, a marine research department, university, county, and the like has need of a secure underwater laboratory to attach their specific marine study. The blocks can therefore be assembled to provide a workbench, staging area, or stable platform to protect an underwater study.

Diver attractions of unlimited description can be created by our invention. The dive attractions of reef, walls, and the like can be accomplished by configuring the modules to suit the application and by attaching an indefinite number of different architectural components. Underwater structures with swim through habitats for marine tropical and other species can be integrated into the system. Educational snorkel "trails" can be established with the use of these modules. Identification plates can be attached to the modules. Specific marine life cultures can be attached to educate and entertain tourist and locals to enhance the economic impact of the shore area. The design is eye pleasing and the interchangeable components can be arranged to suit the builder. Therefore, an infinite variety of architectural shapes can be created, which allows for variable types of underwater architecture.

Although the description above contains many specificities, these should not be construed as limiting the scope of the invention but as merely providing illustrations of some of the preferred embodiments of the invention.

For example, the cross-sectional shape of the rings, male protrusions and female recesses does not have to be round. Instead, the cross-sectional shape can be hollow, solid, rectangular, diamond shaped, rhomboid, triangular, oval or polygonal or any desired cross-sectional shape or overall shape that can be concentrically stacked and interlocked to create the desired results.

Any number of male protrusions and female recesses is possible. There may be as few as one protrusion and recess per block, or many more.

The protrusions need not be oriented facing downward (from the bottom surface) when building a structure and may face upward or even sideways when building a structure. Likewise, the recesses need not be oriented facing upward and may also be oriented downward or sideways when building a structure.

The blocks need not be cubic, but may also be the shape of many different rectangular prisms.

The blocks may have no expansion chamber at all, or the block may have one or more expansion chambers having a variety of shapes.

The blocks may have no flow tubes at all, or the blocks may have many tubes.

The flow tubes may pass only directly through the block, or may pass only through the expansion chamber or both.

Also, any desirable structure may be built with the building blocks. Single blocks may be used or one or more walls may be built. The walls may be configured in many different architectural styles.

The blocks may be constructed of any desirable material or combinations of materials such that the structure is amenable to the attachment and colonization be a variety of marine life.

Thus, the scope of the invention should be determined not by the examples given but rather by the appended claims and their legal equivalents.

What is claimed as new and desired to be protected by Letters Patent is set forth in the appended claims:

1. An underwater building component, comprising:
    a parallelepiped block having opposing top and bottom surfaces, opposing front and back surfaces and opposing first and second side surfaces;
    a first, second, third and fourth pair of male and female members normal to said top and bottom surfaces; each of said male and female members comprising;
        a male protrusion extending normal to said bottom surface;
            said male protrusion having an annular cross-section having a first geometric center in a plane parallel to said bottom surface;
            said annular cross-section having a first outer diameter and a second inner diameter defining a hole;
        a female recess extending normally into said top surface;
            said female recess having a circular cross-section having a second geometric center in a plane parallel to said top surface;
            said circular cross-section having a third diameter greater than said first diameter;
        said first and second geometric centers of said first pair of male and female members aligned along a first axis normal to said top and bottom surfaces adjacent said back and first side surfaces surface of said block;
        said first and second geometric centers of said second pair of male and female members aligned along a second axis normal to said top and bottom surfaces adjacent said back and second side surfaces of said block;
        said first and second geometric centers of said third pair of male and female members aligned along a third axis normal to said top and bottom surfaces adjacent said front and first side surfaces of said block;
        said first and second geometric centers of said fourth pair of male and female members aligned along a second axis normal to said top and bottom surfaces adjacent said front and second side surfaces of said block;
    first, second, third, and fourth holes extending from said top surface to said bottom surface of said block along said first, second, third and fourth axes, a third cross-section of each of said first, second, third, and fourth holes being less than said first diameter;
    a turbulence chamber interior to said block between each of said opposing top and bottom surfaces, opposing front and back surfaces and opposing first and second side surfaces;
    a first flow tube, said first flow tube extending through said block from said front surface of said block into said turbulence chamber; and
    a second flow tube, said second flow tube extending through said block from said turbulence chamber to said back surface of said block.

2. The underwater building component of claim 1, further comprising:
    a first plurality of flow tubes, each flow tube of said first plurality of flow tubes extending through said block from said front surface of said block into said turbulence chamber.

3. The underwater building component of claim 1, further comprising:
    a second plurality of flow tubes, each flow tube of said second plurality of flow tubes extending through said block from said turbulence chamber to said back surface of said block.

4. The underwater building component of claim 1, further comprising:
    a first plurality of flow tubes, each flow tube of said first plurality of flow tubes extending through said block from said front surface of said block into said turbulence chamber; and
    a second plurality of flow tubes, each flow tube of said second plurality of flow tubes extending through said block from said turbulence chamber to said back surface of said block.

5. The underwater building component of claim 4, further comprising:

a third flow tube, said third flow tube extending through said block from said front surface to said back surface of said block, adjacent said turbulence chamber and said first or second side wall.

6. The underwater building component of claim 4, further comprising:

a third plurality of flow tubes, each flow tube of said third plurality of flow tubes extending through said block from said front surface to said back surface of said block, adjacent said turbulence chamber and said first or second side wall.

7. The underwater building component according to claim 6, wherein each of said flow tubes in said first, second and third plurality of flow tubes comprises a hollow tube composed of a material selected from the group comprising bamboo, wood, metal, plastic and combinations thereof.

8. The underwater building component according to claim 7, wherein said turbulence chamber comprises a hollow chamber composed of a material selected from the group comprising wood, metal, plastic and combinations thereof.

9. The underwater building component according to claim 8, wherein said identification plaque comprises a layer of material selected from the group comprising metal, plastic, marble, bronze, slate and combinations thereof.

10. The underwater building component of claim 6, further comprising:

a first channel in said top surface of said block, said first channel extending perpendicularly from said first side of said block to said first axis;

a second channel in said top surface of said block, said second channel extending perpendicularly from said second side of said block to said second axis;

a third channel in said top surface of said block, said third channel extending perpendicularly from said first side of said block to said third axis; and a fourth channel in said top surface of said block, said channel extending perpendicularly from said second side of said block to said fourth axis.

11. A structure comprising a plurality of underwater building components according to claim 10, comprising:

a first underwater building component;

a second underwater building component; and a double ring connector, said double ring connector comprising;

a central connecting member having first and second ends;

a first ring member attached to said first end of said central connecting member;

a second ring member attached to said second end of said central connecting member;

said double ring connector attaching said first underwater building component to said second underwater building component by being placed within a female recess and a channel of said first underwater building component and within a female recess and a channel of said second underwater building component.

12. The structure according to claim 11, wherein said central connecting member further comprises:

a first hollow threaded member having first and second ends;

said first end of said first hollow threaded member being attached to said first ring member;

a second hollow threaded member having first and second ends;

said first end of said second hollow threaded member being attached to said second ring member; and a central screw member having first and second threaded ends;

said first threaded end of said central screw member being screwably mated with said second end of said first hollow threaded member;

said second threaded end of said central screw member being screwably mated with said second end of said second hollow threaded member.

13. The structure according to claim 11, wherein said first ring member of said double ring connector has an internal diameter and an external diameter;

said internal diameter of said first ring member being greater than said first diameter of said male protrusions;

said external diameter of said first ring member being less than said third diameter of said female recesses;

and wherein said second ring member of said double ring connector has an internal diameter and an external diameter;

said internal diameter of said second ring member being greater than said first diameter of said male protrusions;

said external diameter of said second ring member being less than said third diameter of said female recesses.

14. The structure according to claim 13, further comprising:

a third underwater building component;

a first pair of male protrusions of said third underwater building component being placed into a first pair of female recesses of said first underwater building component; and a second pair of male protrusions of said third underwater building component being placed into a first pair of female recesses of said second underwater building component.

15. The structure according to claim 14, further comprising:

a first vertical tie rod;

said first vertical tie rod being passed through said hole passing through said third underwater building component;

said first vertical tie rod being passed through said hole passing through said first underwater building component; and a second vertical tie rod;

said second vertical tie rod being passed through said hole passing through said third underwater building component;

said second vertical tie rod being passed through said hole passing through said second underwater building component.

16. The underwater building component according to claim 10, further comprising:

an identification plaque affixed to said front surface of said block.

17. The underwater building component according to claim 16, wherein said block comprises a concrete structure.

* * * * *